United States Patent
Fuhr et al.

(10) Patent No.: US 12,370,541 B2
(45) Date of Patent: Jul. 29, 2025

(54) LOW TEMPERATURE INDICATOR MIXTURE, DEVICE AND METHOD FOR MONITORING A TEMPERATURE TRANSITION AT LOW TEMPERATURES

(71) Applicant: Fraunhofer-Gesellschaft zur Foerderung der angewandten Forschung e. V., Munich (DE)

(72) Inventors: Guenter R. Fuhr, Berlin (DE); Heiko Zimmermann, Waldbrunn (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 1440 days.

(21) Appl. No.: 16/499,040

(22) PCT Filed: Mar. 26, 2018

(86) PCT No.: PCT/EP2018/057568
§ 371 (c)(1),
(2) Date: Sep. 27, 2019

(87) PCT Pub. No.: WO2018/177968
PCT Pub. Date: Oct. 4, 2018

(65) Prior Publication Data
US 2020/0029551 A1    Jan. 30, 2020

(30) Foreign Application Priority Data
Mar. 31, 2017   (DE) .......................... 102017003171.1

(51) Int. Cl.
*A01N 1/02*   (2006.01)
*A01N 1/14*   (2025.01)
(Continued)

(52) U.S. Cl.
CPC ................ *B01L 3/502* (2013.01); *A01N 1/14* (2025.01); *B01L 3/50825* (2013.01);
(Continued)

(58) Field of Classification Search
CPC ................ B01L 3/502; B01L 3/50825; B01L 2200/147; B01L 2300/047; A01N 1/0236; G01K 11/06; G01K 11/12
(Continued)

(56) References Cited

U.S. PATENT DOCUMENTS 4,163,427 A    8/1979   Cooperman et al.
4,232,552 A *  11/1980  Hof .......................... G01K 13/20
                                                        374/162
(Continued)

FOREIGN PATENT DOCUMENTS

CH        684378 A3    9/1994
CN        2660534 Y   12/2004
(Continued)

OTHER PUBLICATIONS

U.S. Appl. No. 16/499,040, filed Oct. 23, 2023_EP_0497638_B1_1.pdf,Sep. 1996.*
(Continued)

*Primary Examiner* — John E Breene
*Assistant Examiner* — Manuel Salvador Castellon, Jr.
(74) *Attorney, Agent, or Firm* — Caesar Rivise, PC

(57) ABSTRACT

The invention relates to a low temperature indicator mixture for indicating/monitoring a temperature transition within a temperature range of between −20° C. and −160° C., which comprises at least one dye, e.g. oil red, methyl rot, brilliant green, rhodamine B, and at least one alcohol selected from the group that comprises octane-1-ol, nonan-1-ol, propane-1,2-diol, propane-1,3-diol, butane-1,2-diol, butane-1,3-diol,
(Continued)

butane-2-ol, pentane-1,5-diol, pentane-1-ol, cyclopentanol, benzyl alcohol, wherein the melt temperature of the mixture is within the aforementioned temperature range. Further aspects of the invention relate to devices and methods for indicating/monitoring a temperature transition within the aforementioned temperature range, in which devices and methods the aforementioned low temperature indicator mixture is used. In a specific embodiment, a device of this kind comprises at least the following components in at least one closed space: a) a partial region, which is at least partially filled with an indicator mixture as defined above; b) a second partial region, which is at least partially filled with an absorbent material, said material being optionally separated from the indicator mixture by a separating element; and c) optionally means to penetrate the separating element to bring the indicator mixture in a liquid state into contact with the absorbent material. In a method according to the invention for temperature monitoring using a device of this kind, a check is carried out to determine whether at least part of the indicator mixture was absorbed by the absorbent material, which indicates an at least temporary increase in the temperature of the device to at least the melt temperature of the indicator mixture.

16 Claims, 1 Drawing Sheet

(51) Int. Cl.
　　*B01L 3/00*　　　　(2006.01)
　　*G01K 11/06*　　　(2006.01)
　　*G01K 11/12*　　　(2021.01)
(52) U.S. Cl.
　　CPC .............. *G01K 11/06* (2013.01); *G01K 11/12* (2013.01); *B01L 2200/147* (2013.01); *B01L 2300/047* (2013.01)
(58) Field of Classification Search
　　USPC ........................................ 374/160, 161, 102
　　See application file for complete search history.

(56) References Cited

U.S. PATENT DOCUMENTS

| | | | |
|---|---|---|---|
| 5,120,137 | A | 6/1992 | Ou-Yang |
| 5,282,684 | A | 2/1994 | Holzer |
| 5,816,707 | A | 10/1998 | Hof |
| 5,964,181 | A | 10/1999 | Pereyra et al. |
| 6,176,197 | B1 * | 1/2001 | Thompson ............. G01K 11/06 374/E11.006 |
| 6,843,199 | B2 | 1/2005 | Abe et al. |
| 7,727,219 | B2 | 6/2010 | Lampeter |
| 8,967,236 | B2 | 3/2015 | Catton et al. |
| 10,539,488 | B2 | 1/2020 | Goldsborough et al. |
| 10,983,013 | B2 * | 4/2021 | Tada .................... G01K 11/16 |
| 11,549,851 | B2 * | 1/2023 | Fuhr ................... A01N 1/0221 |
| 2009/0129434 | A1 | 5/2009 | Creus et al. |
| 2011/0009535 | A1 | 1/2011 | Mikumo et al. |
| 2015/0328352 | A1 | 11/2015 | Yu et al. |
| 2017/0304759 | A1 | 10/2017 | Foenss |
| 2019/0082681 | A1 | 3/2019 | Fuhr et al. |
| 2019/0082682 | A1 | 3/2019 | Fuhr et al. |
| 2019/0113396 | A1 | 4/2019 | Fuhr et al. |
| 2019/0133111 | A1 | 5/2019 | Fuhr et al. |

FOREIGN PATENT DOCUMENTS

| | | | |
|---|---|---|---|
| CN | 1575190 | A | 2/2005 |
| CN | 102007404 | A | 4/2011 |
| CN | 102172412 | A | 9/2011 |
| CN | 102227117 | A | 10/2011 |
| CN | 102279056 | A | 12/2011 |
| CN | 103725103 | A | 4/2014 |
| CN | 103910956 | A | 7/2014 |
| CN | 104540919 | A | 4/2015 |
| CN | 105392363 | A | 3/2016 |
| DE | 69620217 | T2 | 10/2002 |
| DE | 69535589 | T2 | 5/2008 |
| DE | 102016005007 | A1 | 10/2017 |
| DE | 102016005070 | A1 | 11/2017 |
| DE | 102016005075 | A1 | 11/2017 |
| DE | 102016005076 | A1 | 11/2017 |
| DE | 102016005133 | A1 | 11/2017 |
| EP | 0497638 | B1 * | 9/1996 |
| EP | 2216636 | A1 | 8/2010 |
| JP | S5984128 | A | 5/1984 |
| JP | 59-164929 | A | 9/1984 |
| JP | H06-50825 | A | 2/1994 |
| JP | H07109423 | A * | 4/1995 |
| JP | H07-167716 | A | 7/1995 |
| JP | 2002-323386 | A | 11/2002 |
| JP | 2004-257828 | A | 9/2004 |
| JP | 2005-114364 | A | 4/2005 |
| JP | 2008-542736 | A | 11/2008 |
| WO | WO-8505467 | A1 * | 12/1985 |
| WO | 2007128093 | A1 | 11/2007 |
| WO | 2009127529 | A1 | 10/2009 |

OTHER PUBLICATIONS

U.S. Appl. No. 16/499,040, filed Feb. 14, 2024_WO_8505467_A1_H.pdf,Dec. 5, 1985.*
U.S. Appl. No. 16/499,040, filed Feb. 13, 2024_JP_H07109423_A_H.pdf,Apr. 25, 1995.*
U.S. Appl. No. 16/499,040, filed Feb. 14, 2024_EP_0231499_A1_H.pdf,Aug. 12, 1987.*
English Abstract for EP 2216636 A1 (2010).
English Abstract for CN 2660534 Y (2004).
English Abstract for CN 102172412 A (2011).
English Abstract for CN 102227117 A (2011).
English Abstract for CN 102279056 A (2011).
English Abstract for CN 103725103 A (2014).
English Abstract for Jia et al. (2012) Research and application on commercial time-temperature indicator. Food and Machinery 28(1): 250-258.
English Abstract for Li et al. (2010) Progress in research of time-temperature indicator for cold chain. Innovational Edition of Farm Products Processing 6: 22-25, 44.
Jia et al. (2012) Research and application on commercial time-temperature indicator. Food and Machinery 28(1): 250-258.
Li et al. (2010) Progress in research of time-temperature indicator for cold chain. Innovational Edition of Farm Products Processing 6: 22-25, 44.
Chinese Decision to Grant dated Aug. 4, 2022.
English Abstract for JP 2005-114364 A (2005).
English Abstract for JP 59-164929 A (1984).
English Abstract for JP H06-50825 A (1994).
English Abstract for JP H07-167716 A (1995).
English Abstract for JP 2002-323386 A (2002).
English Abstract for JP 2004-257828 A (2004).
Japanese Notice of Refusal dated Dec. 14, 2021.

* cited by examiner

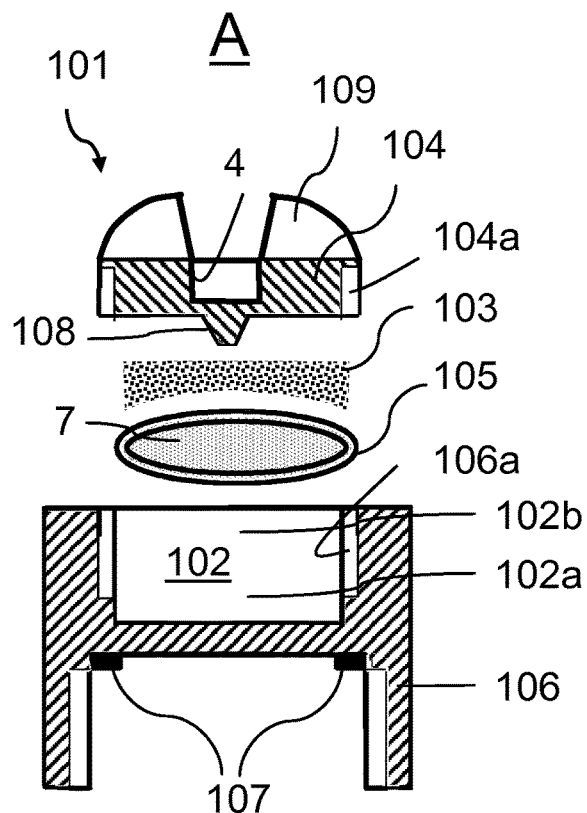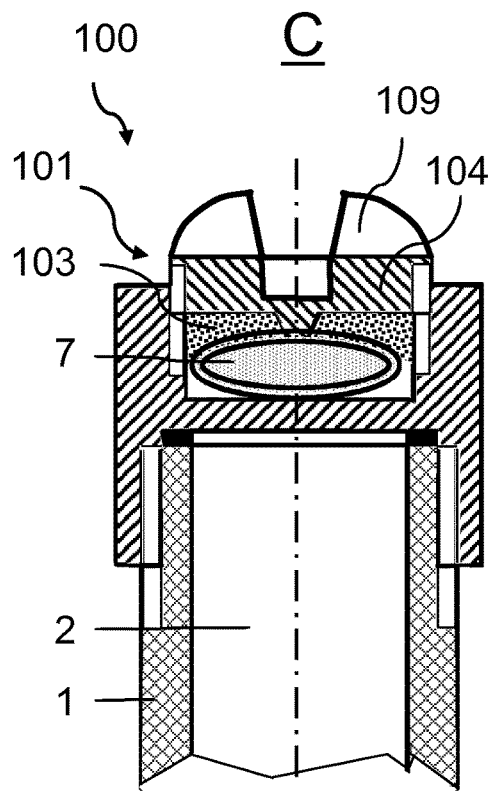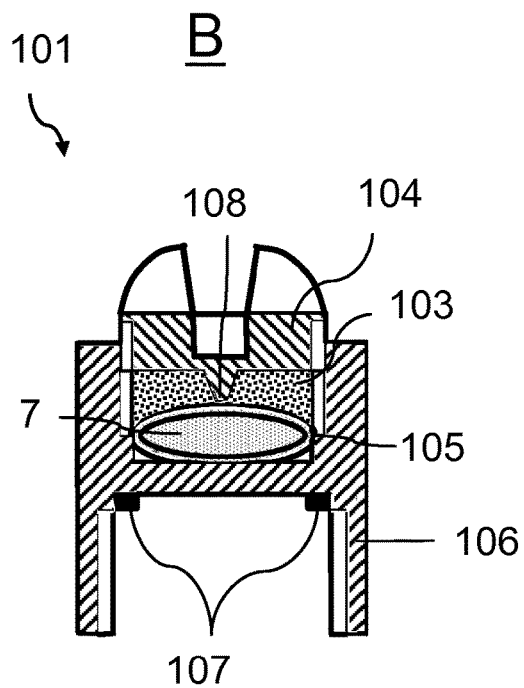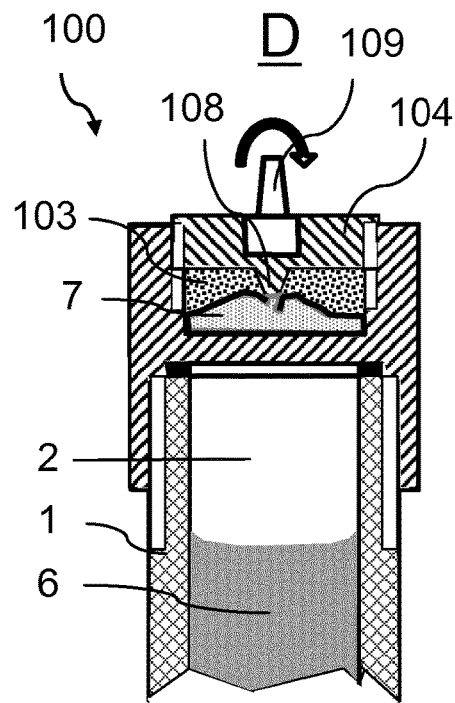

LOW TEMPERATURE INDICATOR MIXTURE, DEVICE AND METHOD FOR MONITORING A TEMPERATURE TRANSITION AT LOW TEMPERATURES

CROSS-REFERENCE TO RELATED APPLICATIONS

This application is a U.S. National Phase Application of PCT/EP2018/057568, filed Mar. 26, 2018, which claims priority to DE 10 2017 003 171.1, filed Mar. 31, 2017, the contents of which applications are incorporated herein by reference in their entireties for all purposes.

BACKGROUND OF THE INVENTION

The invention relates to an indicator mixture which is suitable and intended to monitor a temperature transition at low temperatures, in particular in a range from −20° C. to −160° C. as well as devices and methods for temperature monitoring in the case of which such an indicator mixture is used. The temperature monitoring of a cryopreserved biological sample is of particular interest here.

The low temperature preservation (cryopreservation) of cells is hitherto the only possibility of stopping vital processes reversibly (maintaining vitality) at a cellular level such that they can restart after warming to physiological temperatures. Cryopreservation has developed by way of large biobanks in recent decades to become an essential element for clinics, pharmaceutical companies, species survival, environmental protection and health provision. Biological material is stored in low temperature-compatible sample containers (cryogenic containers), e.g. tubes, straws and bags, of various sizes. In the case of cryopreservation, the stored biomaterial is frozen while maintaining the vitality of the sample material, usually at temperatures below −80° C., for living collections below −140° C. to the temperature of liquid nitrogen. The term "cryogenic sample" is also used below for a cryopreserved sample or a sample intended for cryopreservation.

The quality of the samples is of decisive importance since they are used for cell therapies in clinics, the development of pharmaceuticals and biotechnological products, as national resources and many other things. The storage time varies from a few days up to decades, with a tendency towards long-term storage. The samples are stored in cooled containers, are usually located in metal drawers and racks, with which they are subjected to temperature fluctuations in the case of new deposits or removals. In the case of living storage (cells, cell suspensions and pieces of tissue), it is not only the uninterrupted cooling chain which plays a vital role, but also the avoidance of large jumps in temperature in the deep cooling phase. Since it is not unknown during removal for cryogenic containers to heat up to temperatures of −80° C. to −20° C., despite the fact they are still frozen, reductions in quality unknowingly arise which not only reduce the value of the sample, but can also lead to life-threatening situations when they are used in the clinical sector. Even if samples have only thawed briefly, it is not possible to see in the refrozen state that they no longer match the original condition. However, it is especially important to not only identify a thawing of the biomaterial, but also to document the exceeding of a limit temperature in the range between −160° C. or −140° C. and −20° C.

As is also explained in greater detail in the following text, the development and provision of a suitable low temperature indicator mixture requires the solution of specific problems which do not occur at higher temperatures such that the known solutions and strategies for the development of indicator mixtures for moderate temperatures cannot be applied to this range.

For example, German patent DE 696 20217 T2 discloses a composition which contains alcohol for use in a temperature display device which is supposed to indicate the undershooting of a critical temperature and thus the taking place of an undesirable freezing process. The critical temperature typically lies in the range from approx. +5° C. to −5° C. (cf. e.g. Table 1 of this publication). The system described there is thus totally unsuitable for use in the relevant conditions and temperatures here, in the case of which the sample is typically present already cooled far below the critical temperature and the melting of the frozen indicator mixture indicates the exceeding of a critical temperature, since in the case of this system the display was already irreversibly activated during the first cooling step.

Advantageous devices and methods for temperature monitoring of a cryopreserved biological sample are described, for example, in patent applications DE 10 2016 005 070.5, DE 10 2016 005 075.6, DE 10 2016 005 076.4, DE 10 2016 005 077.2, and DE 10 2016 005 133.7. These documents also disclose the use of an indicator substance, the melting temperature of which lies in a range from −20° C. to −140° C., and various suitable indicator substances are stated.

Further detailed studies of the inventors have now shown that it is necessary to consider a range of factors which have previously not or only barely been studied to provide optimal indicator substances.

A key requirement for a suitable indicator substance is firstly the possibility of selecting or setting the temperature of a detectable change in state, typically a phase transition such as melting or freezing, but not restricted hereto, reproducibly with small deviations in a certain range. However, these temperatures are often not known or are not readily apparent from theoretical considerations.

For example, many hydrocarbons, to a smaller extent, however, also other organic fluids, exhibit a significant thermal hysteresis, i.e. they can be supercooled and frozen at rest at very much lower temperatures than the theoretical freezing temperature, in part with a 20° C. to 80° C. difference to the indications in the literature, and on the other hand do not melt in a defined manner at the melting temperature indicated in the chemical tables, rather often far above this. For example, polyethylene glycol thus freezes in small volumes and unmoved at −60° C., but only unfreezes again at −20° C. The actual freezing and melting temperatures in small volumes and unmoved can thus not be reliably predicted, but rather must generally be determined empirically in the concrete conditions of use.

A second important point is that an indicator substance which represents a mixture of components in principle offers the possibility of setting the melting point or freezing point with the mixture ratio of the components rather precisely over a wider range. Such mixtures lead, however, to complex phase diagrams and the relevant phase transition temperatures must in turn generally be determined empirically.

A further problem in the case of many substances is the high viscosity upon reaching the melting point which can make it difficult or impossible to detect the phase transition depending on the special detection method used.

The fact should also be taken into account that the indicator substances must be compatible with the plastics used most frequently as container material, i.e. can neither dissolve these nor penetrate through them. Moreover, due to potential contact with the biomedical samples, they should be non-toxic in the event of a failure, capable of being stored for a long time and available at low cost.

If the indicator substance contains a dye in order, for example, to be able to more easily determine the position of the indicator substance before and/or after the desired change in state, this dye must be compatible with the substance to be dyed, in particular, soluble and also possess a high dyeing capacity at the intended low temperatures.

Accordingly, an object of the invention is to provide improved means for indicating or monitoring a temperature transition at low temperatures within a range from −20° C. to −160° C. which satisfy the various set demands and make it possible to provide respectively optimized indicator substances for predefined target temperatures to be monitored and thus avoid the disadvantages of conventional techniques.

These objects are achieved according to the invention by the low temperature indicator mixture as well as the devices and methods of the invention. Advantageous embodiments and applications of the invention are explained in greater detail in the following description.

DESCRIPTION OF THE INVENTION

As a result of extensive studies and tests of a large number of potential indicator substances, it was ascertained that in actual fact only a relatively small group of compounds is optimally suitable for the provision of an indicator mixture for low temperatures, in particular for the above-mentioned range from −20° C. to −160° C.

This indicator mixture typically also contains a dye.

A first aspect of the invention accordingly relates to a low temperature indicator mixture for indicating/monitoring a temperature transition within a temperature range from −20° C. to −160° C., in particular −25° C. to −160° C. or −50° C. to −150° C., which comprises the following components:
  at least one dye; and
  at least one alcohol, selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol; and
  wherein the melting temperature of the mixture lies within a temperature range from 20° C. to −160° C., in particular −25° C. to −160° C. or −50° C. to −150° C.

All of the details of phase transition temperatures in this text relate to the temperatures at normal pressure (1013.25 hPa).

Following Table 1 indicates the melting points listed in chemical tables of the particularly suitable alcohol components. These literature melting points are generally measured in larger volumes (ml range) and in the moved state (vibration).

TABLE 1

| | |
|---|---|
| Octan-1-ol | Melting point: −14.9° C. |
| Nonan-1-ol | Melting point: −6° C. |
| Propane-1,2-diol | Melting point: −68° C. |
| Propane-1,3-diol | Melting point: −32° C. |
| Butane-1,2-diol | Melting point: −114° C. |
| Butane-1,3-diol | Melting point: <−50° C. |
| Butan-2-ol | Melting point: −114.7° C. |
| Pentane-1,5-diol | Melting point: −16° C. |
| Benzyl alcohol | Melting point: −15° C. |
| Pentan-1-ol | Melting point: −78.2° C. |
| Cyclopentanol | Melting point: −19° C. |

In the following text, the terms "melting point" and "melting point of the indicator mixture", unless explicitly referred to as the "table melting temperature", relate in each case to the actual melting point in typical conditions of use, measured in particular in volumes of less than 1 ml and in an unmoved state.

Any dye which satisfies at least the following conditions is in principle possible as the dye:
  intensive dyeing capacity even in small quantities and concentrations (e.g. starting from a saturated color solution addition in the range of <1 volume-%, generally in the per thousand or sub-per thousand range).
  frost-tolerant
  lightfast during dispatch and also at the relevant low temperatures
  soluble in all components of the indicator mixture
  no separating out during freezing
  no reaction with plastic materials which come into contact with the indicator mixture.

The dye is preferably selected from the group which comprises triphenylmethane dyes, rhodamine dyes, in particular xanthene, azo dyes as well as phenazine and phenothiazine dyes.

In more specific embodiments, the dye is selected from the group which comprises oil red, methyl red, brilliant green, rhodamine B, neutral red, methylene blue or other dyes which are used to dye cells in cytology.

The concentration of the dye in the alcohol component can vary greatly depending on the dye and alcohol.

In general, the concentration in the case of intensive coloring should be kept as low as possible so that the dye molecules do not change the freezing and melting properties of the alcohols in which they are dissolved or increase their viscosity. The dye concentration typically lies in a range of <10 volume-%, in particular <1% or <0.1%, i.e. in the percent or per thousand or sub-per thousand range.

According to one specific embodiment of the invention, however, a sufficiently high concentration of the dye in the alcohol component is deliberately used to increase the melting point of the resultant mixture so that it lies significantly above the melting point of the pure alcohol. The melting point of the mixture can be, for example, at least 10° C., preferably at least 20° C. or 30-70° C., higher than the melting point of the mixture without dye.

The dye concentration can be, for example, 10-100%, 50-100%, 70-100%, 80-100% or 90-100% of the saturation concentration. In this manner, the melting point of the indicator mixture can be set in a certain temperature range. For example, a saturated solution of rhodamine B in butan-2-ol has a melting point of approx. −60° C. (i.e. approx. 60° C. higher than the melting point of the pure alcohol).

In particularly preferred embodiments of the low temperature indicator mixture according to the invention, the at least one alcohol is propane-1,3-diol, propane-1,2-diol or butan-2-ol.

A combination of 1,3-propane diol+dye is very well suited, for example, as an indicator mixture for frozen material which is stored at −30° C. to −80° C. (melting temperature TS=−25° C.).

A combination of 1,2-propane diol+dye is very well suited, for example, as an indicator mixture for frozen material which is stored at −80° C. to −196° C. (TS=−60° C.).

A combination of butan-2-ol +dye is very well suited, for example, as an indicator mixture for frozen material which is stored at −140° C. to −196° C. (TS=−116° C.).

The TS values of these examples were determined in 1 ml solution at absolute rest in the laboratory.

As already mentioned above, an indicator substance which represents a mixture of components in principle offers the possibility of setting the melting point or freezing point rather precisely with the mixture ratio of the components over a wide range.

This can generally be better achieved via the mixing of two alcohols with significantly different melting temperatures than via a high dose of a dye.

One embodiment of the invention is accordingly characterized in that the indicator mixture comprises at least two different alcohol components:
 a) an alcohol selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol;
 b) an alcohol selected from the group which comprises octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, benzyl alcohol with a lower melting point than the alcohol of component a);
 wherein the mixture ratio of components a) and b) is set so that the melting temperature of the mixture lies within a temperature range from −20° C. to −160° C., in particular from 25° C. to −160° C. or −50° C. to −150° C.

More specific embodiments of the invention are characterized in that the low temperature indicator mixture comprises one of the following combinations of components a) and b):
octan-1-ol and butan-2-ol in a mixture ratio of 5 to 95 vol.-%;
octan-1-ol and pentan-1-ol in a mixture ratio of 5 to 95 vol.-%;
octan-1-ol and propane-1,2-diol in a mixture ratio of 5 to 95 vol.-%;
nonan-1-ol and butan-2-ol in a mixture ratio of 5 to 95 vol.-%;
nonan-1-ol and propane-1,2-diol in a mixture ratio of 5 to 95 vol.-%;
nonan-1-ol and pentan-1-ol in a mixture ratio of 5 to 95 vol.-%;
propane-1,2-diol and butan-2-ol in a mixture ratio of 5 to 95 vol.-%;
propane-1,2-diol and propane-1,3-diol in a mixture ratio of 5 to 95 vol.-%;
propane-1,2-diol and butane-1,2-diol in a mixture ratio of 5 to 95 vol.-%;
propane-1,3-diol and butan-2-ol in a mixture ratio of 5 to 95 vol.-%;
propane-1,3-diol and butane-1,2-diol in a mixture ratio of 5 to 95 vol.-%;
pentane-1,5-diol and butan-2-ol in a mixture ratio of 5 to 95 vol.-%;
benzyl alcohol and butan-2-ol in a mixture ratio of 5 to 95 vol.-%;
pentan-1-ol and butan-2-ol in a mixture ratio of 5 to 95 vol.-%;
pentan-1-ol and methanol in a mixture ratio of 5 to 95 vol.-%;
cyclopentanol and butan-2-ol in a mixture ratio of 5 to 95 vol.-%;
cyclopentanol and propane-1,2-diol in a mixture ratio of 5 to 95 vol.-%;
cyclopentanol and pentan-1-ol in a mixture ratio of 5 to 95 vol.-%;
cyclopentanol and butane-1,2-diol in a mixture ratio of 5 to 95 vol.-%;
wherein the indicated value of the mixture ratio relates in each case to the ratio of the former component in the mixture of both components.

A yet more specific embodiment of the invention is characterized in that, in the case of this low temperature indicator mixture, components a) and b) are selected from propane-1,3-diol, propane-1,2-diol and butan-2-ol and/or the dye is selected from the group which comprises oil red, methyl red, brilliant green and rhodamine B.

In particularly preferred embodiments, the low temperature indicator mixture according to the invention comprises, for example, propane-1,2-diol and butan-2-ol in a mixture ratio of 40 to 60 vol.-% (results in a melting temperature of approx. −90° C.), propane-1,2-diol and propane-1,3-diol in a mixture ratio of 30 to 70 vol.-%, or propane-1,3-diol and butan-2-ol in a mixture ratio of 30 to 70 vol.-%.

As already mentioned above, upon reaching the melting point, many substances have a relatively high viscosity, i.e. at this temperature they tend to be viscous or plastic and not easily movable or transportable.

For methods and devices for detecting a temperature transition as described below here which are based among other things on the fact that an initially immobile indicator substance becomes "liquid", i.e. mobile, upon exceeding of a limit temperature to be monitored, the actual melting temperature of the indicator substance is therefore often less relevant, but rather that temperature above the melting temperature at which the viscosity of the melted substance has reduced to such an extent that the necessary liquid transport can take place.

This temperature is also referred to below as the threshold temperature and typically lies in a temperature range from 3-30° C. or 5-30° C., for example, 3-10° C., 3-20° C., 5-10° C. or 5-20° C., above the nominal melting temperature.

In another preferred embodiment of the invention, the low temperature indicator mixture is therefore characterized in that the liquid mixture in a temperature range of 3-30° C. or 5-30° C. above the melting temperature has a viscosity in a range from 10 to $10^6$ mPa*s, preferably 10 to $10^4$ mPa*s or 10 to $10^3$ mPa*s.

A second, closely related aspect of the present invention relates to the use of the low temperature indicator mixture described above for indicating or monitoring a temperature transition within a temperature range from −20° C. to −160° C., in particular −25° C. to −160° C. or −50° C. to −150° C.

This use can include, for example, the incorporation of the stated low temperature indicator mixture into a device for indicating/monitoring a temperature transition within a temperature range from −20° C. to −160° C., in particular −25° C. to −160° C. or −50° C. to −150° C.

A further aspect of the present invention accordingly relates to such devices for indicating or monitoring a temperature transition within a temperature range from −20° C. to −160° C., in particular −25° C. to −160° C. or −50° C. to −150° C., which comprise as one component the low temperature indicator mixture described above.

In one embodiment of the invention, the device for indicating or monitoring a temperature transition at the stated low temperatures comprises at least the following components in at least one closed-off space:
 a) a first sub-region of the space which is filled at least partially with an indicator mixture as described above;
 b) a second sub-region which is accessible for the indicator mixture in the liquid state;

c) where applicable, a barrier for the indicator mixture which adjoins the first sub-region as well as, where applicable, means for breaking through the barrier.

At the starting temperature, e.g. the storage temperature of a frozen material, in particular a cryopreserved biological sample, the low temperature indicator mixture is in an immobile, typically plastic or solid state and exclusively in a first sub-region of a closed-off space in this device.

If a limit temperature to be monitored which corresponds to the melting temperature of the indicator mixture or a threshold temperature which lies above the melting temperature at which the viscosity of the liquefied indicator mixture has reduced to a sufficient degree is exceeded, the indicator mixture becomes liquid or mobile and travels from the first sub-region into the second sub-region of the space. If at least a part of the indicator mixture is thus located in the second sub-region at a subsequent control time, it can be concluded that the limit temperature was at least briefly exceeded in the interim period.

The closed-off space optionally has a barrier which adjoins the first sub-region for the indicator mixture. This barrier can be located in particular between the first sub-region and the second sub-region or in a portion of the second sub-region which adjoins the first sub-region.

A direct embodiment of the invention which is simple in this regard provides that the barrier is a separating element which is permeable in relation to the indicator mixture in the liquid state and which is arranged between the first and second sub-region. The barrier thus forms a separating layer between the first and second sub-region which is permeable for the indicator substance only in the liquid state, but not in the frozen state. The separating element which is permeable in relation to the indicator mixture in the liquid state can be embodied, for example, as a porous separating wall, membrane, film, skin or capillary system.

This barrier can also be a separating element which represents or comprises at least a part of the wall of a container which tightly encloses the liquid indicator mixture (in the first sub-region). This barrier or this separating element can be broken through at a predetermined point in time by mechanical means or chemical or physical stimuli, in particular exceeding or undershooting a specific limit temperature.

In one advantageous embodiment, this separating element is configured, upon cooling of the device to a storage temperature which lies below the melting temperature of the indicator mixture, to rip at at least one point as a result of the thermal contraction so that the indicator mixture can travel in the liquid state of aggregation via the opening formed by the at least one rip point from the first sub-region into the second sub-region. In the case of proper storage, the indicator mixture is frozen and can thus not travel into the second sub-region despite the openings which are present.

The separating element can have at least one predetermined breaking point at which the separating element rips during cooling of the device to the storage temperature. A predetermined breaking point in this sense is a given point of the separating element at which it rips during cooling to storage temperature. This has the advantage that the position and size of the rip point is predetermined and thus also the throughflow rate of the indicator mixture enabled as a result, if the indicator mixture is liquid.

According to another advantageous variant, a separating element is broken through mechanically at a desired point in time. For this purpose, the device for temperature monitoring can have an activation part which is guided movably in relation to the container and which can be brought from a first position, referred to here as the starting position, into a second position, referred to here as the activation position. The movement into the activation position brings about that the activation part destroys, by mechanical pressure, the container, more precisely the separating element, at at least one point in particular such that the container is permeable for the indicator mixture in the liquid state. A mechanism is thus provided with which the device for temperature monitoring can be activated at a desired point in time.

Both variants have the advantage that such devices which serve as an indicator apparatus can be stored in a fully mounted and filled manner for as long as desired at room temperature since the separating element is not permeable in the initial state.

A further advantage of a barrier which adjoins the first sub-region and which is located between the first sub-region and the second sub-region or in a portion of the second sub-region which adjoins the first sub-region lies in the fact that the barrier can be configured so that the indicator mixture does not travel immediately entirely into the second sub-region of the space upon liquefying, rather this is performed with a delay and thus a predetermined time is required for this. A measure for the duration of a past exceeding of the melting temperature can therefore be derived from the quantity of indicator mixture which is located in the second sub-region at a specific point in time.

The delaying of the liquid transport can be achieved, for example, in that the barrier comprises a material arranged in the second sub-region and adjoining the first sub-region with a liquid-absorbing structure, i.e. absorbent material. The material can be a porous material or medium. The material, e.g. an absorbent mass, can be, for example, filter paper, e.g. like that of a conventional kitchen roll or a cigarette filter paper, a compact, cellulose discs, e.g. handkerchief cellulose discs, plaster and/or chalk dust, but also a layer of nano- or microporous material. This can be influenced in terms of properties, e.g. by variation of the porous structure, so that it promotes the absorbance of the liquid by capillary forces. It can, however, also be another material which is suitable for absorbing liquid or absorbent.

According to a first such embodiment, the indicator mixture is initially located in the solidified state next to the barrier in the form of the absorbent material or lies on top of the barrier, but cannot penetrate into it. In the liquid state of aggregation and thus after exceeding of the melting temperature or also the threshold temperature defined above of the indicator mixture, the indicator mixture located in the first sub-region diffuses slowly into the material which adjoins the first sub-region with a liquid-absorbing structure or is absorbed via capillary forces. As a result of this, the material is penetrated by the indicator mixture. The indicator mixture in this manner travels in a delayed manner into the second sub-region. The degree of delay depends on the speed of diffusion.

A further advantage is that the position of the diffusion front is a measure of the time over which the indicator substance and thus also the sample in the receiving space was exposed to the impermissible temperature range. This can be ascertained by ascertaining the position of the diffusion front. The speed of diffusion is indeed also a function of the viscosity which itself is temperature-dependent; it is, however, often adequate to make an estimation between a few minutes and a few hours or days.

It is thus possible to detect both the exceeding of a limit temperature and the duration of the exceeding.

A combination of several indicator mixtures with various melting temperatures (optionally e.g. in various closed off spaces) and several diffusion sections which combine or branch off is furthermore possible in order to thus be able to determine more precise time indications in relation to the duration of the exceeding of the temperature.

The display temperature of a system according to the invention (e.g. a device for indicating/monitoring a temperature transition as described above and below) which comprises a barrier, where applicable, including an absorbent material is produced as follows: it is not the melting temperature of the indicator mixture which is produced from measurements in volumes of a few ml and more or is found in educational and table books, but rather the temperature at which a volume of the mixing solution of less than 1 ml, in particular <100 µl or also <30 µl, becomes fluid and the viscosity, wettability and other chemical properties reach a value at which the indicator mixture:
  1. wets the absorbent medium and penetrates into it and/or diffuses through the barrier.
  2. a noticeable or measurable dyeing is apparent in the system from the outside.

The ideal case that this is the case with the table value of the melting temperature will occur to an ever lower degree with increasingly lower temperature. On the contrary, the indicator mixture liquefies in the idle system and in small volumes above the melting temperature indicated in the data sheets or determined in greater volumes. In the case of the stated low temperatures of −20° C. to −160° C., in particular −25° C. to −160° C. or −50° C. to −150° C., the viscosity is often still too high at the actual melting temperature (>$10^4$ mPa*s) for the indicator mixture to be able to travel into the absorbent medium or through the permeable barrier. It is only when this occurs and the indicator mixture visibly or measurably penetrates into the volume which was not previously occupied that the system has reached its display temperature. The display temperature of the system therefore generally lies a few ° C., e.g. 3 or 5° C., up to 30° C. and more above the actual melting temperature and up to 50° C. and more above the table melting temperature (where known) of the indicator mixture.

In one particularly preferred embodiment, the barrier comprises both a separating element and an absorbent material as described above.

In the case of a first advantageous variant of this embodiment, a surface of the absorbent material which adjoins the first sub-region has a cover as the separating element. The cover is configured, upon cooling of the device to a storage temperature which lies below the melting temperature of the indicator mixture, to pass from a first state of the cover in which it is impermeable with respect to the indicator mixture irreversibly into a second state of the cover in which it is permeable for the indicator mixture. In the first state, the cover is impermeable, i.e. not porous, for the indicator mixture even in the liquid state of aggregation. The cover thus forms a separating layer. The cover can be, for example, a correspondingly configured membrane, a covering layer, a skin or a film or the like which only rips as a result of shrinkage upon cooling to the storage temperature or is otherwise permeable for liquids so that the indicator mixture in the liquid state of aggregation can pass via the opening formed by the at least one rip point or in general passage points from the first sub-region into the second sub-region.

A material is preferably used for this cover which shrinks to a greater extent during reduction in the temperature than the material which forms the closed off space, and as a result forms openings through which the liquid indicator mixture can penetrate into the absorbent material or material with a liquid-absorbing structure. In the case of proper storage, the indicator mixture is frozen and cannot thus pass, despite the openings which are present, into the material or into the second sub-region of the space.

In the case of a second advantageous variant, a separating element which represents or comprises at least a part of the wall of the container which encloses the indicator mixture in the first sub-region and is liquid-impermeable is mechanically broken through at a desired point in time. For this purpose, the device for temperature monitoring can have an activation part which is guided movably in relation to the separating element and which can be brought from a first position, referred to here as the starting position, into a second position, referred to here as the activation position. The movement into the activation position brings about that the activation part destroys, by mechanical pressure, the separating element at at least one point in particular such that it becomes permeable for the indicator mixture in the liquid state. A mechanism is thus provided with which the device for temperature monitoring can be activated at a desired point in time.

Both variants in turn have the advantage that such devices which serve as an indicator apparatus can be stored in a fully mounted and filled manner for as long as desired at room temperature since the separating element is not permeable in the initial state.

The device according to the invention for indicating or monitoring a temperature transition at low temperatures in one advantageous embodiment accordingly comprises at least the following components in at least one closed-off space:
  a) a first sub-region of the space which is filled at least partially with an indicator mixture as described above;
  b) a second sub-region which is filled at least partially with an absorbent material which is separated, where applicable, from the indicator mixture by a separating element;
  c) where applicable, means for breaking though the separating element in order to bring the indicator mixture in the liquid state into contact with the absorbent material.

The absorbent material is in principle not particularly restricted and can be selected, for example, from the group which comprises cellulose materials, particulate inorganic materials such as plaster, chalk, porous membranes, fabric and knitted fabric, nano- and microporous aluminum oxide layers.

The optimal material can be selected, among other things, as a function of the viscosity of the liquid indicator mixture at a specific limit or threshold temperature.

On the contrary, the indicator mixture can be selected so that its viscosity at the melting temperature or a predetermined limit temperature, the exceeding of which should be monitored, lies in a range which enables good liquid absorbance by or good liquid transport through the absorbent material.

This viscosity typically lies in a range from 10 to $10^4$ mPa*s, preferably 10 to $10^3$ mPa*s.

The container described above for the indicator mixture can be embodied, for example, as a plastic pad, which can be produced at particularly low cost. The container can also be embodied as a glass ball, which in the case of destruction generates an audible cracking noise and thus acoustic feedback for activation.

Such devices for indicating or monitoring a temperature transition can form, for example, a part of the (preferably transparent) cover or base or the wall of a container for frozen material, in particular for a cryopreserved biological sample, or represent this.

A further related aspect of the present invention relates to a method for indicating/monitoring a temperature transition within a temperature range from −20° C. to −160° C., in particular −25° to −160° C. or −50° C. to −150° C., in the case of which the low temperature indicator mixture described above or the devices described above for temperature monitoring are used.

To avoid repetition, the above embodiments relating to the low temperature indicator mixture and the devices which contain these, in particular their advantageous embodiment variants, should also be regarded as disclosed with respect to the method and be capable of being claimed.

In one embodiment, the method according to the invention for indicating/monitoring a temperature transition within a temperature range from −20° C. to −160° C. comprises at least the following steps:
  a) providing an indicator mixture as described above in a first sub-region of a closed off space which comprises a first sub-region and a second sub-region, wherein the closed off space also, where applicable, has a barrier, which adjoins the first sub-region, for the indicator mixture which can be located in particular between the first sub-region and the second sub-region or in a portion of the second sub-region which adjoins the first sub-region;
  b) cooled storage of the indicator mixture at a desired temperature within the above temperature range at which the indicator mixture is frozen;
  c) where applicable, causing the breaking through of a barrier adjoining the first sub-region, which barrier is located between the first sub-region and the second sub-region or in a portion of the second sub-region which adjoins the first region, after freezing of the indicator mixture;
  d) checking whether at least a part of the indicator mixture is located in the second sub-region which indicates an at least temporary increase in the temperature to at least the melting temperature or at least the threshold temperature of the indicator mixture.

In a more specific embodiment, the method according to the invention for indicating/monitoring a temperature transition within a temperature range from −20° C. to −160° C., in particular −25° C. to −160° C. or −50° C. to −150° C., comprises at least the following steps:
  a) providing a device as described above, which comprises an absorbent material as described above in relation to the device;
  b) cooled storage of the device at a desired temperature within the above temperature range at which the indicator mixture is frozen;
  c) bringing about the breaking through of a separating element between the indicator mixture and the absorbent material after freezing of the indicator mixture;
  d) checking whether at least a part of the indicator mixture was absorbed by the absorbent material, which indicates an at least temporary increase in the temperature to at least the melting temperature or at least the threshold temperature of the indicator mixture.

In one preferred embodiment of the method according to the invention, the indicator mixture is selected so that its melting temperature or the temperature at which the viscosity of the melted indicator mixture undershoots a certain target value corresponds to a predetermined limit temperature, the exceeding of which should be monitored.

The method according to the invention can be used in particular for temperature monitoring of frozen material, preferably a cryopreserved biological sample.

According to this method, a device for temperature monitoring, as described in this document, can thus be provided, wherein the device contains at least one indicator mixture in the frozen state in the first sub-region of a closed off space. The method further comprises cooled storage of the cryogenic container including the device for temperature monitoring as well as checking whether indicator mixture is located at a later point in time in the second sub-region of the closed off space of the device for temperature monitoring.

If this is the case, it can be concluded that the melting temperature or threshold temperature of the indicator mixture and thus the limit temperature to be monitored have been exceeded even if only for a brief period of time.

One particular advantage of the invention thus lies in the fact that the presence of indicator mixture in the second sub-region directly indicates that a cryogenic sample has been heated above a definable limit temperature, even if only for a short period of time. This can be quickly and easily ascertained by visual inspection or also in a technically automated manner by means of a correspondingly configured measuring apparatus without the sample having to be removed from the sample container or thawed out.

According to one advantageous further development of the method, a characteristic variable can furthermore be determined, which variable indicates a measure of the quantity of indicator mixture which passed into the second sub-region and/or a measure of the quantity of indicator mixture located in the first sub-region. Such a variable indicates a measure for the duration of time which the sample has spent above the limit temperature.

A characteristic variable is, for example, a value which indicates the quantity of indicator mixture in the first or second sub-region. The variable can be the fill level of the indicator mixture in the second sub-region or the length of the diffusion section/course which the indicator mixture in the absorbent material with the liquid-absorbing structure has reached.

According to one particularly preferred embodiment of the method, a device for temperature monitoring which has either a separating element or a cover which only become permeable for the indicator mixture in the liquid state of aggregation during cooling is used to carry out the method. It was already described above that a separating element can be arranged between the first and second sub-region, which separating element is configured, upon cooling of the device to a storage temperature which lies below the melting temperature of the indicator mixture, to rip at at least one point due to the thermal contraction so that the indicator mixture in the liquid state of aggregation can travel via the opening formed by the at least one rip point from the first sub-region into the second sub-region.

It was also described that a surface of the absorbent material which adjoins the first sub-region can have as the separating element a cover, e.g. a membrane or covering layer, which is configured, upon cooling of the device to a storage temperature which lies below the melting temperature of the indicator mixture, to pass from a first state of the cover in which it is impermeable with respect to the indicator mixture irreversibly into a second state of the cover in which it is permeable for the indicator mixture.

According to another particularly preferred embodiment of the method, a device for temperature monitoring which has either a separating element or a cover which can be mechanically broken through in the manner described above in order to enable the liquid indicator mixture to access the second sub-region of the closed off space is used to carry out the method.

The preferred embodiments and features of the invention described above can be combined with one another.

A non-restrictive, illustrative example of a device according to the invention for indicating or monitoring a temperature transition is depicted in FIG. 1.

FIG. 1 illustrates in several cross-sectional views an exemplary embodiment 100 of a device for temperature monitoring. View A shows in this case an exploded representation of a cover 101 of a cryogenic tube 1 in which an apparatus for temperature monitoring is integrated. Device 100 comprises cryogenic tube 1 with a receiving space 2 for receiving a biological sample 6 as well as cover 101 which has a chamber 102 which contains an indicator mixture 7 which is separated from an absorbent material 103 by a separating element in the inactive state. Cover 101 is also referred to below as a temperature-sensitive (T-sensitive) cover. View B shows cover 101 in the mounted state, view C illustrates a cryogenic tube 1 which is ready for sale with a receiving space 2 for receiving a biological sample 6 and with screwed-on T-sensitive cover 101. Views A to C show device 100 in the as yet inactive state.

T-sensitive cover 101 comprises four parts: a screw insert 104, referred to below as screw-in part 104, an insert with liquid-absorbing structure 103, referred to below as absorbent material 103, which must be able to suck up liquid indicator mixture 7, a container 105 for the indicator mixture 7, embodied here by way of example as plastic pad 105, which contains dyed liquid as indicator mixture 7, if this is not frozen, and a base body 106 for screwing onto a commercially available cryogenic tube 1, embodied here as plastic cap 106.

In the inactive state of device 100, plastic pad 105 forms an impervious shell for indicator mixture 7 located therein; this shell forms a barrier which, in the inactive state, prevents indicator mixture 7 from coming into contact with absorbent material 103. The embodiment as a plastic pad has the advantage that it can be produced at very low cost.

Screw-in part 104 is embodied to be transparent or semi-transparent at at least one point so that at least a part of absorbent material 103 is visible from above through screw-in part 104. Screw-in part 104 can be produced, for example, from a transparent or semi-transparent material for this purpose. Base body 106 can furthermore be produced from a transparent or semi-transparent material for this purpose. In this manner, it is possible to check by means of a simple visual inspection from above whether the color state of absorbent material 103 has changed. This is the case e.g. if dyed indicator mixture 7 has penetrated into absorbent material 103 and as a result dyes it, which is further described below.

The base body or plastic cap 106 has an H-shaped cross-section, as a result of which two cylindrical cavities are formed. Upper cavity 102 forms a chamber with a first sub-region 102a in which container 105 with indicator substance 7 is located and with a second sub-region 102b in which absorbent material 103 is located.

The lower cavity serves to receive an upper end portion of cryogenic tube 1 in order to imperviously close it off. Cryogenic tube 1 is sealed off with a sealing ring 107. An engagement 4, e.g. a hexagonal hole via which screw-in part 104 can be screwed into base body 106 is located in screw-in part 103. Screw-in part 104 can also have blades 109 via which screw-in part 104 can also be screwed in. For the purpose of screwing in, there is provided on screw-in part 104 an external thread 104a which engages in a corresponding internal thread 106a of base body 106 which is provided on a side wall of upper cavity 102.

As already mentioned, views A to C show device 100 in the as yet inactive state. This means that plastic pad 105 filled with dyed indicator mixture is not destroyed and is impervious so that indicator mixture 7 in the liquid state cannot escape. Indicator mixture 7 in liquid form is initially located inside plastic pad 105. Absorbent material 103 located thereabove is not in contact with indicator mixture 7 as a result of intact plastic pad 105.

Screw-in part 104 is initially half screwed in (inactive state). In order to screw it further in, e.g. a quarter or half turn, a plastic stop in thread 103a, 106a must be broken through. It is thus ensured that the apparatus for temperature monitoring and/or the T-sensitive cover cannot be activated prior to use. Should this nevertheless occur prior to cryogenic storage of device 100 or sample 6, absorbent material 103 located in base body 106 is dyed and may consequently not be used. The transport and intermediate storage of cover 101 in the inactive state can be carried out over any desired period of time which promotes trade and stockpiling.

View D of FIG. 10 shows the activation of the device after the storage temperature is reached, in the present case e.g. <−140° C.

Indicator mixture 7 is selected so that it is no longer liquid at the storage temperature in container 105, but rather is already solidified. Activation of the device is performed by screwing in screw-in part 104 in the case of frozen indicator mixture 7. Screw-in part 104 has at its lower side facing absorbent material 103 a protruding projection 108, e.g. in the form of a tip or a thorn. By screwing in screw-in part 104, projection 108 is bored into plastic pad 105 and destroys it. As a result, absorbent material 103 comes into direct contact with dyed indicator mixture 7. This is so viscous or even solid at the storage temperature that it is not drawn into absorbent material 103. The still ongoing thermal shocks are also not adequate for diffusion.

The device for temperature monitoring is now activated (active). As soon as a threshold value temperature which indicates the melting point of the mixture of indicator mixture during cryogenic storage is exceeded, frozen indicator mixture 7 becomes liquid. The viscosity drops with rising temperature until a threshold is exceeded from which absorbent material 103 takes in the liquid via capillary forces and thus takes on its color. This process is irreversible, i.e. even after subsequent renewed freezing of indicator mixture 7, the coloring of absorbent material 103 is maintained. If it is thus subsequently ascertained in the event of a visual inspection that absorbent material 103 has a coloring, it can be concluded that the melting temperature of the indicator mixture and moreover a slightly higher temperature than that of the melting temperature were also exceeded, at which indicator mixture 7 has become so viscous that it was taken in via capillary forces into absorbent material 103. The type and thickness of absorbent material 103 determines how quickly the apparent coloring occurs.

That which applies to absorbent material 103 and indicator mixture 7 inside base body 106 also applies to the temperature in biosample 6. An absorbent material which is dyed (e.g. red) thus indicates that biosample 6 has also at least temporarily exceeded the above-mentioned temperatures. Since this process can also not be reversed upon renewed deep-freezing, device 1 thus retains the information about impermissible heating. Although the invention has been described with reference to specific exemplary embodiments, it is apparent for a person skilled in the art that various changes can be made and equivalents can be used as a replacement without departing from the scope of the invention. The invention should consequently not be restricted to the disclosed exemplary embodiments, but rather should comprise all exemplary embodiments which fall into the scope of the enclosed claims. In particular, the invention also claims protection for the subject matter and the features of the subordinate claims independently of the claims referred to.

The invention claimed is:

1. A low temperature indicator mixture for indicating/monitoring a temperature transition within a temperature range from −20° C. to −160° C., which comprises:
   at least one alcohol selected from the group consisting of octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, and benzyl alcohol; and
   at least one dye provided in a solution of the at least one alcohol,
   wherein:
   a concentration of the at least one dye in the at least one alcohol is in a range of 70-90% of a saturation concentration of the at least one dye in the at least one alcohol;
   wherein the at least one alcohol comprises at least two different alcohol components;
   a) an alcohol selected from the group consisting of octan-1-ol, nonan-1-ol, propane-1,2-diol, propane-1,3-diol, butane-1,2-diol, butane-1,3-diol, butan-2-ol, pentane-1,5-diol, pentan-1-ol, cyclopentanol, and benzyl alcohol;
   b) an alcohol selected from the group consisting of octan-1-ol, nonan-1-ol, propane-1,2-diol propane-1,3-diol, butane-1,2-diol, butane-1,3-diol, butan-2-ol, pentane-1,5-diol, pentan-1-ol cyclopentanol, and benzyl alcohol with a lower melting point than the alcohol of component a); and
   wherein a mixture ratio of components a) and b) is set so that a melting temperature of the mixture lies within a temperature range from −20° C. to −160° C.

2. The low temperature indicator mixture according to claim 1, wherein:
   a mixture ratio of components a) and b) is set so that a melting temperature of the mixture lies within a temperature range from −25° C. to −160° C. or from −50° C. to −150° C.

3. The low temperature indicator mixture according to claim 1, comprising one of the following combinations of components a) and b):
   octan-1-ol and butan-2-ol in a mixture ratio of 5 to 95 vol.-%;
   octan-1-ol and pentan-1-ol in a mixture ratio of 5 to 95 vol.-%;
   octan-1-ol and propane-1,2-diol in a mixture ratio of 5 to 95 vol.-%;
   nonan-1-ol and butan-2-ol in a mixture ratio of 5 to 95 vol.-%;
   nonan-1-ol and propane-1,2-diol in a mixture ratio of 5 to 95 vol.-%;
   nonan-1-ol and pentan-1-ol in a mixture ratio of 5 to 95 vol.-%;
   propane-1,2-diol and butan-2-ol in a mixture ratio of 5 to 95 vol.-%;
   propane-1,2-diol and propane-1,3-diol in a mixture ratio of 5 to 95 vol.-%;
   propane-1,2-diol and butane-1,2-diol in a mixture ratio of 5 to 95 vol.-%;
   propane-1,3-diol and butan-2-ol in a mixture ratio of 5 to 95 vol.-%;
   propane-1,3-diol and butane-1,2-diol in a mixture ratio of 5 to 95 vol.-%;
   pentane-1,5-diol and butan-2-ol in a mixture ratio of 5 to 95 vol.-%;
   benzyl alcohol and butan-2-ol in a mixture ratio of 5 to 95 vol.-%;
   pentan-1-ol and butan-2-ol in a mixture ratio of 5 to 95 vol.-%;
   pentan-1-ol and methanol in a mixture ratio of 5 to 95 vol.-%;
   cyclopentanol and butan-2-ol in a mixture ratio of 5 to 95 vol.-%;
   cyclopentanol and propane-1,2-diol in a mixture ratio of 5 to 95 vol.-%;
   cyclopentanol and pentan-1-ol in a mixture ratio of 5 to 95 vol.-%; or
   cyclopentanol and butane-1,2-diol in a mixture ratio of 5 to 95 vol.-%;
   wherein the mixture ratio relates in each case to a ratio of the former component in the mixture of both components.

4. The low temperature indicator mixture according to claim 1, wherein components a) and b) are selected from the group consisting of propane-1,3-diol, propane-1,2-diol and butan-2-ol and/or the at least one dye is selected from the group consisting of oil red, methyl red, brilliant green and rhodamine B.

5. The low temperature indicator mixture according to claim 4, comprising propane-1,2-diol and butan-2-ol in a mixture ratio of 40 to 60 vol.-%, or propane-1,2-diol and propane-1,3-diol in a mixture ratio of 30 to 70 vol.-%, or propane-1,3-diol and butan-2-ol in a mixture ratio of 30 to 70 vol.-%.

6. The low temperature indicator mixture according to claim 1, wherein a liquid mixture in a temperature range of 3-30° C. or 5-30° C. above the melting temperature has a viscosity in a range from 10 to 106 mPa*s, or from 10 to 104 mPa*s.

7. A device for indicating/monitoring a temperature transition within a temperature range from −20° C. to −160° C., −25° C. to −160° C. or −50° C. to −150° C., comprising at least the following components in at least one closed-off space:
   a) a first sub-region of the space which is filled at least partially with the indicator mixture according to claim 1;
   b) a second sub-region which is accessible for the indicator mixture in a liquid state;
   c) where applicable, a barrier which adjoins the first sub-region and which is located between the first sub-region and the second sub-region or in a portion of the second sub-region which adjoins the first sub-region, wherein the barrier is breakable and/or permeable such that the indicator mixture in the liquid state can enter the second sub-region.

8. The device according to claim 7, wherein the second sub-region is at least partially filled with an absorbent material which is separated, where applicable, by the barrier from the indicator mixture.

9. The device according to claim 7, which forms a part of a cover, a base or a wall of a container for frozen material, in particular for a cryopreserved biological sample or represents this.

10. The device according to claim 8, wherein the absorbent material is selected from the group consisting of cellulose materials, plaster, chalk, porous membranes, fabrics, knitted fabrics, nano-porous aluminum oxide layers and microporous aluminum oxide layers.

11. A method for indicating/monitoring a temperature transition within a temperature range from −20° C. to −160° C., or from −25° C. to −160° C. or −50° C. to −150° C., comprising
- a) providing an indicator mixture according to claim 1 in a first sub-region of a closed-off space which comprises a first sub-region and a second sub-region, wherein the closed-off space also, where applicable, has a barrier, which adjoins the first sub-region, for the indicator mixture which is located between the first sub-region and the second sub-region or in a portion of the second sub-region which adjoins the first sub-region;
- b) cooled storing of the indicator mixture at a desired temperature within said temperature range at which the indicator mixture is frozen;
- c) where applicable, causing a breaking through of the barrier between the first sub-region and the second sub-region or in a portion of the second sub-region which adjoins the first region after freezing of the indicator mixture; and
- d) checking whether at least a part of the indicator mixture is located in the second sub-region which indicates an at least temporary increase in the temperature to at least the melting temperature of the indicator mixture.

12. A method for indicating/monitoring a temperature transition within a temperature range from −20° C. to −160° C., or from −25° C. to −160° C. or −50° C. to −150° C., comprising
- a) providing a device according to claim 8 which comprises an absorbent material;
- b) cooled storing of the device at a desired temperature within said temperature range at which the indicator mixture is frozen;
- c) bringing about a breaking through of the barrier between the indicator mixture and the absorbent material after freezing of the indicator mixture; and
- d) checking whether at least a part of the indicator mixture was absorbed by the absorbent material, which indicates an at least temporary increase in the temperature to at least the melting temperature of the indicator mixture.

13. The method according to claim 11, wherein the device comprises the barrier and/or an absorbent material and the presence of indicator mixture in the second sub-region of the closed-off space or in the absorbent material indicates that the indicator mixture was increased at least temporarily to a temperature above the melting temperature at which the viscosity of the melted indicator mixture undershoots a certain target value so that the melted indicator mixture can pass the barrier or be absorbed by the absorbent material.

14. The method according to claim 11, wherein the indicator mixture is selected so that its melting temperature or the temperature at which the viscosity of the melted indicator mixture undershoots a certain target value corresponds to a predetermined limit temperature, the exceeding of which is monitored.

15. The method according to claim 13, wherein the indicator mixture is selected so that its viscosity at the melting temperature or a predetermined limit temperature above the melting temperature, the exceeding of which is monitored, lies in a range which allows the absorption of liquid or transport of liquid through or into the absorbent.

16. The method according to claim 15, wherein the viscosity is in in a range from 10 to 1000 mPa*s.

* * * * *